US007277699B2

(12) United States Patent
Ito et al.

(10) Patent No.: US 7,277,699 B2
(45) Date of Patent: *Oct. 2, 2007

(54) REMOTE OPERATING SYSTEM (75) Inventors: Hiromichi Ito, Yokohama (JP);
Tomochika Ozaki, Yokohama (JP);
Tetsuo Shinagawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 395 days.

This patent is subject to a terminal disclaimer.

(21) Appl. No.: 10/725,455

(22) Filed: Dec. 3, 2003

(65) Prior Publication Data

US 2004/0109548 A1    Jun. 10, 2004

Related U.S. Application Data (63) Continuation of application No. 10/317,113, filed on Dec. 12, 2002, now Pat. No. 6,693,999, which is a continuation of application No. 09/942,873, filed on Aug. 31, 2001, now Pat. No. 6,510,212.

(30) Foreign Application Priority Data

Mar. 19, 2001  (JP)  ............................. 2001-078888

(51) Int. Cl.
H04M 3/00   (2006.01)
(52) U.S. Cl. ............. 455/420; 379/102.03; 379/102.01
(58) Field of Classification Search ................. 455/420; 379/110.01, 102.03; 340/825.22
See application file for complete search history.

(56) References Cited

U.S. PATENT DOCUMENTS

| 5,671,267 | A | 9/1997 | August et al. ............. 455/420 |
| 5,909,183 | A | 6/1999 | Borgstahl et al. ........ 340/825.22 |
| 6,415,023 | B2 | 7/2002 | Iggulden et al. ......... 379/102.03 |
| 6,510,212 | B2 | 1/2003 | Ito et al. ................. 379/102.03 |
| 2002/0110228 | A1* | 8/2002 | Silverman et al. ...... 379/110.01 |

FOREIGN PATENT DOCUMENTS

| JP | 10164246 | 6/1998 |
| JP | 11259491 | 9/1999 |
| JP | 200059867 | 2/2000 |
| JP | 2001022438 | 1/2001 |
| KR | 200012794 | 3/2000 |
| KR | 200032334 | 6/2000 |
| WO | 9859283 | 12/1998 |
| WO | 9949680 | 9/1999 |

* cited by examiner

Primary Examiner—Joseph Feild
Assistant Examiner—Phuoc Doan
(74) Attorney, Agent, or Firm—Mattingly, Stanger, Malur & Brundidge, P.C.

(57) ABSTRACT

A remote operating system capable of operating a given home electric appliance by simple operation from a portable telephone is disclosed. A service equipment connected to an internet and a public network provides a home page using the function of a portable telephone to browse the internet home pages. An instruction to operate the home electric appliance is given by way of the home page using the portable telephone. Thus, an operating instruction is given through the public network to a remote operation adaptor installed in a home to control the home electric appliance.

12 Claims, 6 Drawing Sheets

| 305 TELEPHONE NO. | 306 ID | 307 PASSWORD | 308 HOME PAGE | 309 REMOTE OPERATION ADAPTOR TELEPHONE NO. |
|---|---|---|---|---|
| 09012345678 | abcdef | k28dj0sdl | a001.htm | 0312345678 |
| 09087654321 | zxncvl | a98redls8s | b001.htm | 045123456 |
| ⋮ | ⋮ | ⋮ | ⋮ | ⋮ |

| APPLIANCE ID 321 | APPLIANCE NAME 322 | OPERATION ID 323 | OPERATION NAME 324 | NETWORK 325 | APPLIANCE ADDRESS 326 | COMMAND 327 |
|---|---|---|---|---|---|---|
| 09 | AIR CONDITIONER | 01 | OPERATION MODE:COOL | 01 | 001 | 01 |
| 09 | AIR CONDITIONER | 02 | OPERATION MODE:HEAT | 01 | 001 | 02 |
| --- | --- | --- | --- | --- | --- | --- |

REMOTE OPERATING SYSTEM

The present application is a continuation of application Ser. No. 10/317,113, filed Dec. 12, 2002 now U.S. Pat. No. 6,693,999; which is a continuation of application Ser. No. 09/942,873, filed Aug. 31, 2001, now U.S. Pat. No. 6,510,212, the contents of which are incorporated herein by reference.

BACKGROUND OF THE INVENTION

The present invention relates to a remove operating system, a remote operating method, a remote operation adaptor and a service equipment, or in particular to a remote operation technique for controlling various home electric appliances from a portable telephone having the function of connecting to an internet and browsing home pages.

A conventional system for operating home electric appliances at a remote place is a remote operating system disclosed, for example, in JP-A-2000-59867. In the remote operating system described in this publication, the operation control information for controlling the operation of a home electric appliance at a remote place is transmitted to the particular home electric appliance by electronic mail distributed through an internet thereby to control the operation of the home electric appliance.

In the remote operating system using the electronic mail described above, the user describes and transmits the name of the apparatus and the contents of operation of an appliance to be remotely operated. In the case of the recording operation of VTR, for example, the user transmits an electronic mail having the description to the effect that [Video] [3/30, 21:00 to 22:00, triple speed]. A control unit arranged in a home accesses the mail server at regular time intervals, and when an electronic mail arrives, receives it. The control unit checks the contents of the electronic mail thus received, and in the case where the electronic mail gives an instruction for remote operation, controls the electric appliance connected to the control unit in accordance with the description.

SUMMARY OF THE INVENTION

In a home electric appliance, the user is not accustomed to the direct-viewing operation by the user interface through a remote controller attached to the appliance. Take the operation of an air conditioner as an example. The user controls the operation of the air conditioner using buttons such as "COOL" and "HEAT" of the air conditioner. As to the temperature setting, the user changes the temperature setting using such buttons as "UP" and "DOWN" of the remote controller while watching the current temperature setting displayed on a liquid crystal display unit of the remote controller. For the temperature setting job to be carried out by electronic mail, the user is required to prepare and transmit an electronic mail containing the description such as "[Air conditioner] [Cool, 25° C.]", for example.

On the other hand, transmission of an electronic mail requires an environment connected to an internet. Generally, a personal computer connected to the internet is used. Recently, however, it has become possible to transmit an electronic mail from a portable telephone using an internet. In the case where the operation of an air conditioner is required at a place outside the home of the user as described above, however, it is difficult to prepare an environment for using a personal computer connected to an internet, except in a working place or the like equipped with a personal computer. The transmission of an electronic mail from a portable telephone, on the other hand, is possible substantially from any place. Nevertheless, the basic requirement to use the ten-keys as an operation interface for inputting a text poses the problem that preparation of a text for electronic mail is very cumbersome.

The object of the present invention is to obviate the aforementioned problem of a system for operating home electric appliances from a place outside a home, and provide a remote operating system capable of operating the home electric appliances from a portable telephone by a simple process.

In order to achieve this object, according to the present invention, there is provided a remote operating system in which an instruction to operate an electric appliance in a home is given by way of a home page displayed on the screen of a portable telephone having the function to connect an internet using the internet connection service of a portable telephone company. Specifically, a remote operation adaptor is installed in a home, which is connected to a communication line such as the public telephone line and has the function of controlling the home electric appliances in a home based on the data sent thereto through the communication line. Further, a user (customer) of a portable telephone registered in a service provider is supplied from the service provider with a home page connected by an internet connection service provided from the portable telephone company, and an instruction to control an electric appliance in a home is given to the remote operation adaptor by way of the home page through a communication line such as the public telephone line.

The remote operating system having this configuration makes possible the remote operation of electric appliances in a home by watching a home page displayed on the screen of a portable telephone having the function to connect to an internet or by using an interactive user interface utilizing a home page.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF THE INVENTION

Figure 1:
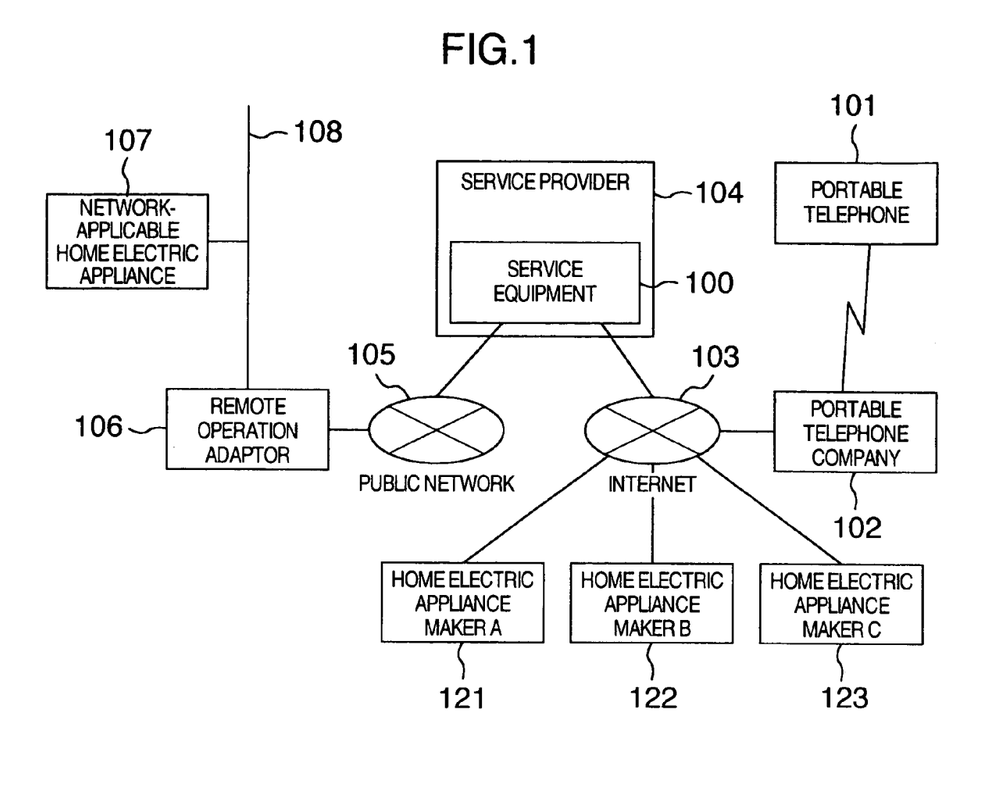
FIG. 1 is a diagram for explaining a configuration of a remote operating system according to an embodiment of the present invention.

Embodiments of the invention will be explained below with reference to the drawings. FIG. 1 is a diagram showing a configuration of a remote operating system according to an embodiment of the invention.

In FIG. 1, reference numeral 101 designates a portable telephone, numeral 102 a portable telephone company, numeral 103 an internet, numeral 104 a service provider having a service equipment 100, numeral 105 a public network, numeral 106 a remote operation adaptor, numeral 107 a network-applicable home electric appliance, numeral 108 a home network, numeral 121 a home electric appliance maker A, numeral 122 a home electric appliance maker B, and numeral 123 a home electric appliance maker C.

The portable telephone 101 is capable of using the portable telephone service provided by the portable telephone company, and according to this embodiment, can use the portable telephone services including a voice speech and an internet service by data communication. The portable telephone company 102 provides an internet connection service for the portable telephone shown in FIG. 2. The internet connection service will be described in detail later. The portable telephone company 102 is connected to the internet 103 by the internet connection service. The service provider 104 having the service equipment 100 is connected to the internet 103. As a result, the home pages supplied by the service provider can be accessed from the portable telephone 101 through the portable telephone company 102 and the internet 103.

The service equipment 100 of the service provider 104 is connected to the remote operation adaptor 106 installed in a home, through the public network such as the ordinary telephone line or the digital telephone line. Other communication network such as a leased line can be used in place of the public network 105.

The remote operation adaptor 106 installed in a home is connected to the network-applicable home electric appliance 107 by the home network 108. The home network 108 is used for data transmission by power line or data transmission by radio. The network-applicable home electric appliances are those having the function of connecting to the home network 108 such as the air conditioner, lighting equipment, TV or VTR.

The information-providing equipment of the home electric appliance makers A121, B122, C123 are connected to the internet 103 by the internet connection service, and the service provider 104 having the service equipment 100 can access, through the internet 103, the home pages provided by the home electric appliance makers.

Figure 2:
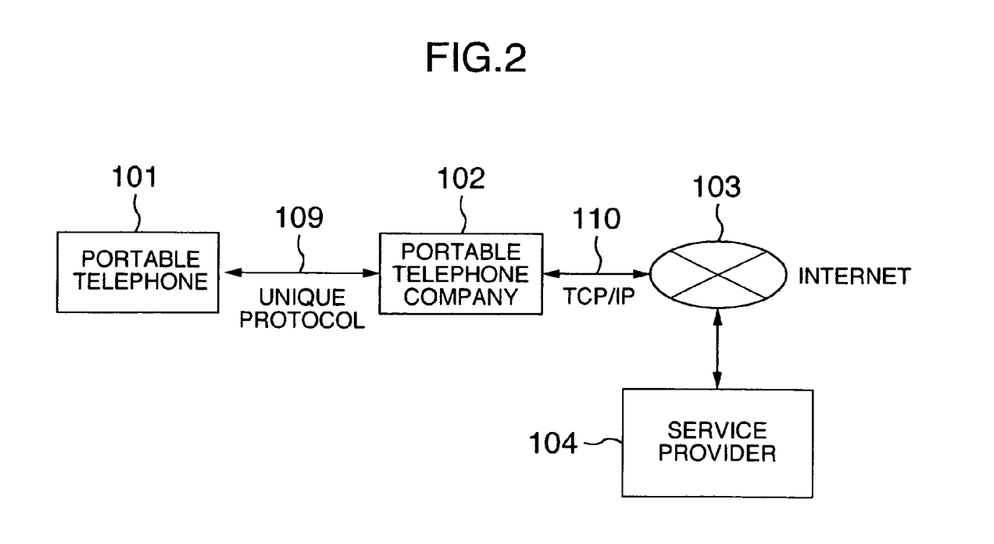
FIG. 2 is a diagram for explaining a configuration of an internet connection service for a portable telephone according to an embodiment of the invention.

FIG. 2 shows a configuration of the internet connection service by the portable telephone offered from the portable telephone company 102. The portable telephone 101 and the portable telephone company 102 are connected to each other by a radio network 109. For using the internet connection service, the communication with a unique protocol determined by the portable telephone company is carried out between the portable telephone 101 and the portable telephone company 102. The portable telephone 101 includes means for establishing communication with a unique protocol and a browser (a WWW browser for reading the contents of a WWW server, in this case) for displaying home pages on the display unit of the portable telephone. The portable telephone company 102, on the other hand, is connected to the internet 103 by a leased line 110 or the like and also to the service provider 104 connected by a leased line. Between the portable telephone company 102 and the service provider 104, the communication is carried out with TCP/IP (Transmission Control Protocol/Internet Protocol) which is an ordinary communication protocol for the internet. The portable telephone company 102 converts between a unique protocol and TCP/IP, so that the home page supplied by the service provider 104 connected to the internet 103 can be browsed using the browser mounted on the portable telephone 101.

Figure 3:
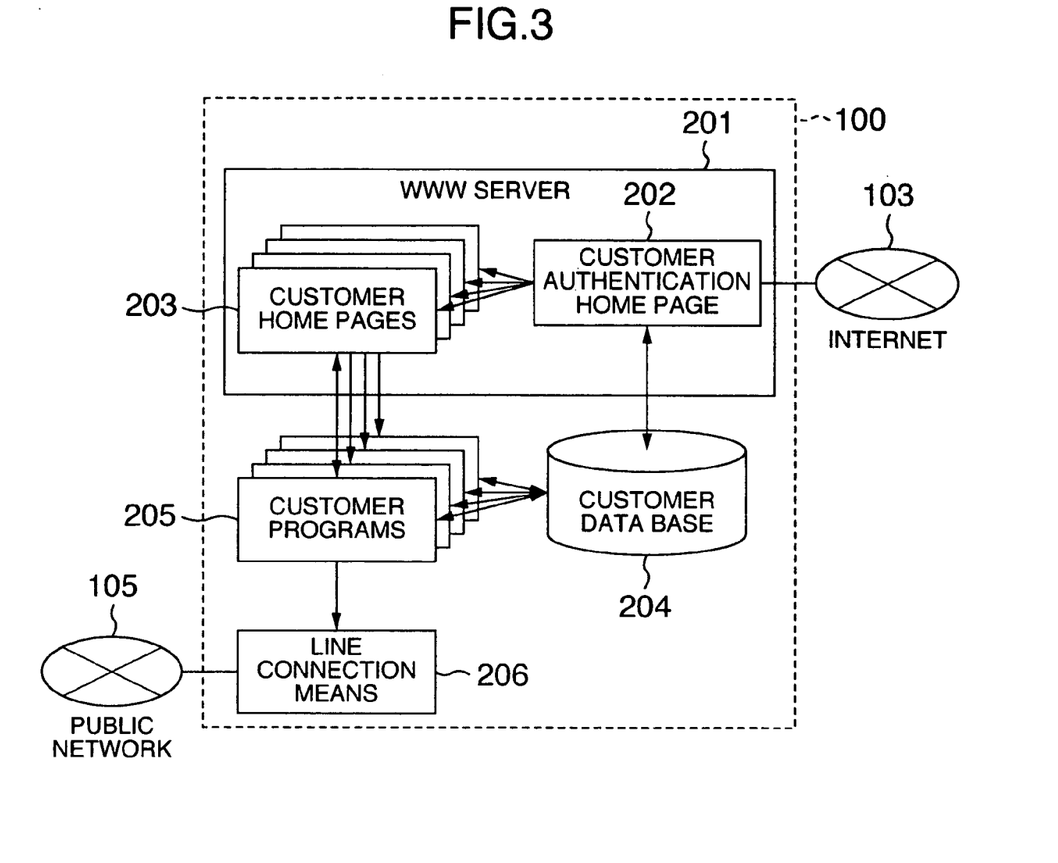
FIG. 3 is a diagram for explaining a configuration of a service equipment of a service provider according to an embodiment of the invention.

FIG. 3 shows a configuration of the service equipment 100 of the service provider 104 according to this embodiment. The service equipment 100 includes a WWW (World Wide Web) server 201. The WWW server 201 includes a customer authentication home page 202, customer home pages 203, appliance home pages (described later with reference to FIG. 6) linked with the customer home pages 203, a customer data base 204, customer programs 205 linked with the home page for each customer, and line connection means 206 for connecting to the public network 105.

In FIG. 1, in the case where the service provider 104 is accessed from the portable telephone 101 through the portable telephone company 102 and the internet 103, the customer authentication home page 202 is displayed on the screen of the portable telephone 101.

Figure 4:
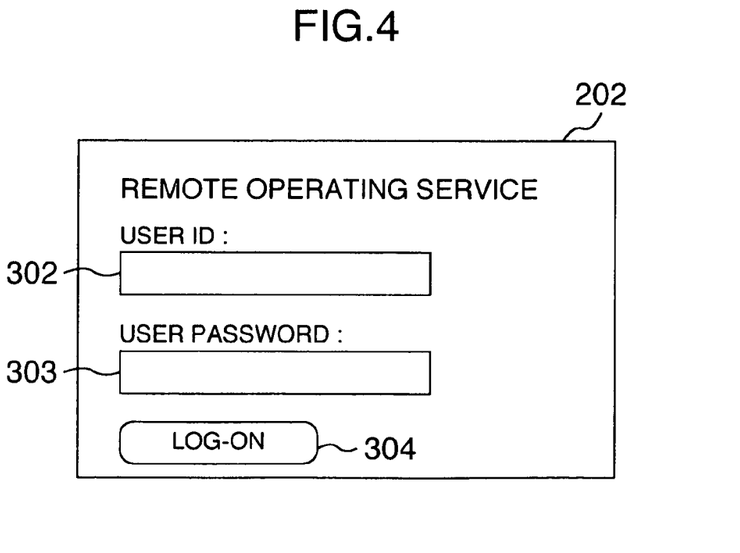
FIG. 4 is a diagram for explaining an example of a configuration of a customer authentication home page according to an embodiment of the invention.

According to this embodiment, the customer authentication home page 202, as shown in FIG. 4, is configured of an area 302 for inputting a user ID, an area 303 for inputting a user password, and a button 304 for giving a log-on instruction. The user of this remote operating service inputs the user ID and the user password in the customer authentication home page 202 displayed on the portable telephone 101, and by selecting the log-on button 304, gives a request to the service provider for logging on the remote operating service.

The service provider 104 authenticates the user by the customer data base 204 based on the user ID and the user password input in the customer authentication home page, and the telephone number of the portable telephone 101 sent from the portable telephone company 103.

Figure 5:
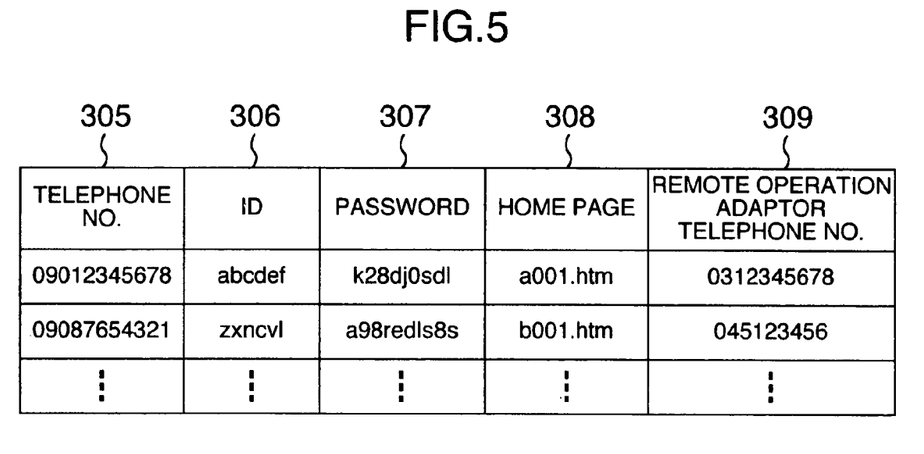
FIG. 5 is a diagram for explaining an example of a configuration of a customer data base according to an embodiment of the invention.

As shown in FIG. 5, according to this embodiment, the customer data base 204 contains a list including at least the telephone number 305, the ID 306, the password 307, the home page 308 and the remote operation adaptor telephone number 309. The telephone number 305 is that of the portable telephone 101, which is sent from the portable telephone company 102 as described above. The user ID 306 and the user password 307 are input in the customer authentication home page 202 by the user (customer) enjoying the remote operating service by the portable telephone 101. Generally, the ID 306 is determined by the service provider 104 and notified to the user (customer) when the user (customer) registers for participation in (for use of) the remote operating service provided by the service provider. With regard to the password 307, on the other hand, the service provider 104 determines and notifies a provisional password to the user, which can be changed later by the user to an arbitrary password. The home page 308 indicates the URL (Uniform Resource Locator) of the home page for each user, which home page is accessed based on the URL.

The remote operation adaptor telephone number 309 is the telephone number of the public network connected with the remote operation adaptor 106 of the user (customer).

In the case where the user ID and the user password input by the user of the portable telephone 101 in the customer authentication home page 202 coincide with the contents held in the customer data base 204, the customer home page 203 designated by the URL of the home page 308 indicated by the customer data base 204 is displayed on the portable telephone 101 of the user.

In the case where the portable telephone 101 can hold the user ID information for each home page once accessed and can operate in keeping with the Cookie or the OPS (Open Profiling Standard), then the service equipment 100 of the service provider 104 can eliminate, by using the Cookie or the OPS, the need for the user (customer) to input the user ID and the user password in the customer authentication home page for the second and subsequent accesses by the user (customer).

Figure 6:
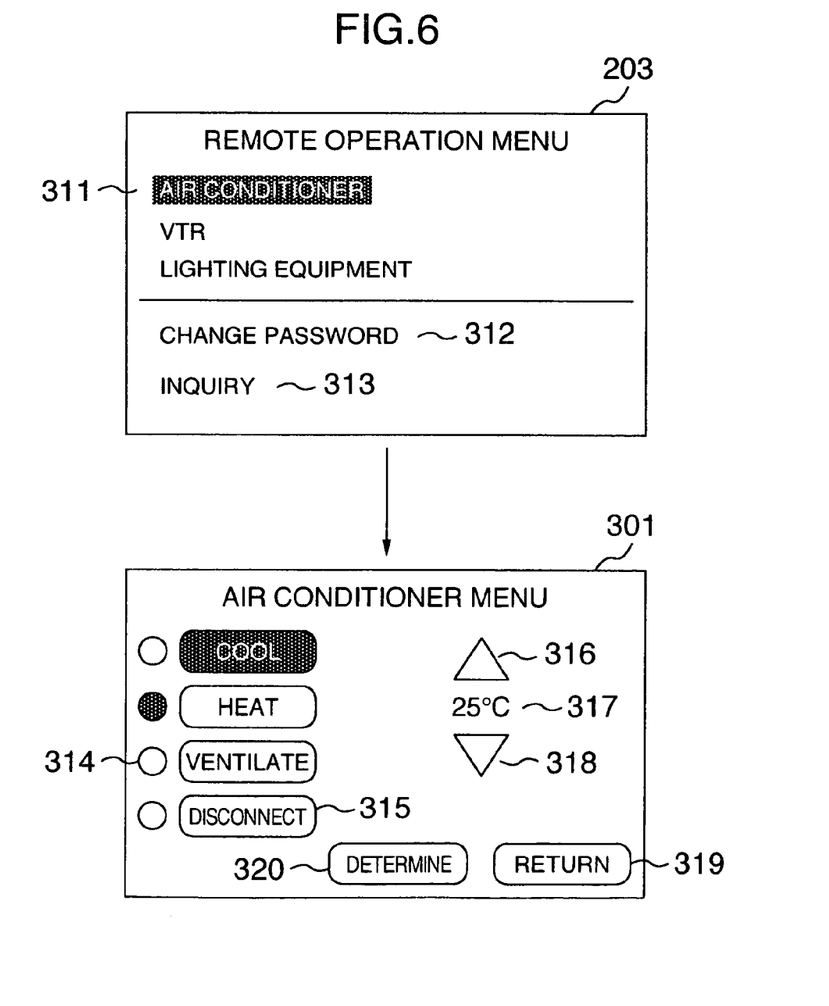
FIG. 6 is a diagram for explaining an example of a configuration of a customer home page and an appliance home page according to an embodiment of the invention.

According to this embodiment, the customer home page 203, as shown in FIG. 6, is configured of a service menu including a list 311 of apparatuses that can be remotely operated by the user (customer) in the remote operating service, a password change 312 and an inquiry 313. The password change 312 is for requesting to change the password 307 held in the customer data base 204, and the inquiry 313 is for transmitting an inquiry for the remote operating service to the service provider 104.

The remote operating service user selects an apparatus (home electric appliance) to be operated such as an air conditioner in the customer home page 203 displayed on the portable telephone 101. According to this embodiment, the selection of an apparatus (home electric appliance) in the customer home page 203 is the selection and determination of an intended apparatus (home electric appliance) by a cursor displayed in reverse video. Now, assume that the the air conditioner has been selected from the apparatus (home electric appliance) list 311 in the customer home page 203. The appliance home page 301 corresponding to the air conditioner linked with the customer home page 203 is displayed. The appliance home page 301 is an operation panel of the air conditioner, and includes an operation mode (cool, heat, ventilate, switch off) list 315, a check box 314 for selecting the operation mode, a room temperature setting indication 317, a button 316 for increasing the room temperature setting, a button 318 for decreasing the room temperature setting, a button 319 for giving an instruction to return to the customer home page 203, and a determination button 320 for notifying that the setting is determined.

In the case where the air-conditioner is operated using the remote operating service, the user of the portable telephone 101 checks off the check box 314 of the desired operation mode in the operation mode list 315 in the appliance home page 301 displayed on the portable telephone 101, and further, after setting the desired room temperature on the room temperature setting indication 317 by the button 316 for increasing the room temperature setting and the button 318 for decreasing the room temperature setting, selects the determination button 320.

Upon completion of the operation in the customer home page 203 or the appliance home page 301 on the portable telephone 101, the customer program 205 is started by the service provider 104. The customer program 205 is linked with the customer home page 203 or the appliance home page 301. An instruction to operate the air conditioner, for example, is given to the remote operation adaptor 106 installed in the home of the user (customer), through the public network 105 by controlling the line connection means 206 in accordance with the setting of the air conditioner in the appliance home page 301. The service provider 104 is connected to the remote operation adaptor 106 of the customer by controlling the line connection means 206 and dialing the telephone number indicated in the remote operation adaptor telephone number 309 indicated by the customer data base 204.

In accordance with the operation of the customer program 205, the contents of the instruction for controlling the home electric appliances given to the remote operation adaptor 106 is considered different with the maker and the type of each product. The service provider 104, therefore, acquires the control specification data for the home electric appliance constituting the basic data for preparing the customer program 205 and the appliance home page 301 by the service equipment 100 or the host system not shown of the service provider, from the information providing system of the home electric appliance makers A121, B122 and C123 through the internet 103. In the process, the service provider 104 pays a consideration to the home electric appliance maker from which the information is acquired. This consideration may be either money paid by a net account settlement system corresponding to the information amount received or the control monitor information of each home electric appliance supplied to the home electric appliance maker.

Figure 7:
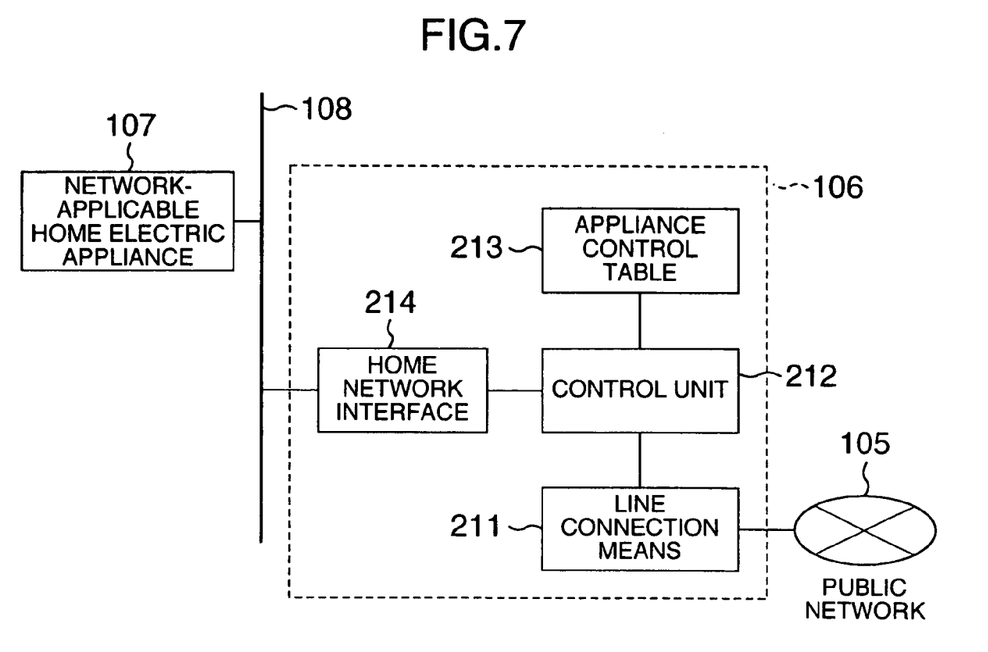
FIG. 7 is a diagram for explaining an example of a configuration of a remote operation adaptor according to an embodiment of the invention.

FIG. 7 shows a configuration of the remote operation adaptor 106 according to this embodiment. The remote operation adaptor 106 includes line connection means 211 connected to the public network 105, a control unit 212 for controlling the remote operation adaptor 106, an apparatus control table 213 for storing the data used to control the network-applicable home electric appliance 107 connected to the remote operation adaptor 106 and a home network interface 214 for connecting to the home network 108.

As described above, the service provider 104 gives an instruction to control an apparatus through the public network 105 for controlling the home electric appliances in a home. The remote operation adaptor 106 receives this instruction from the public network 105 through the line connection means 211. The control unit 212 that has received this instruction generates a command for controlling the intended apparatus using the apparatus control table 213 based on the contents of the instruction, and controls the network-applicable home electric appliance connected to the home network 108 through the home network interface 214.

Figure 8:
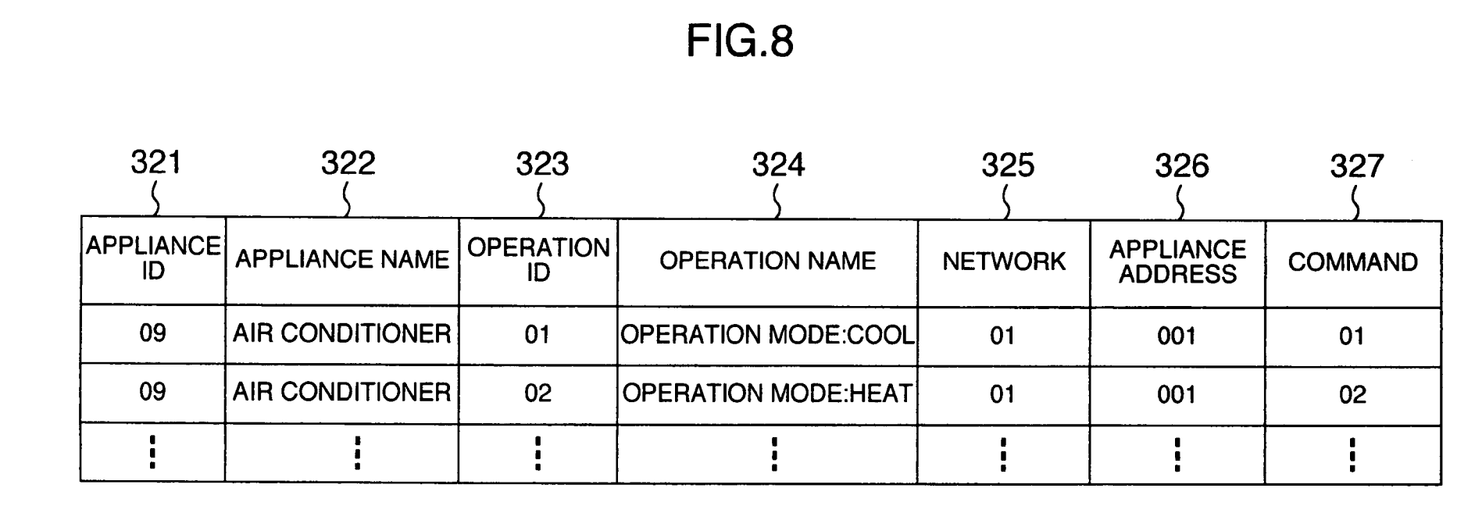
FIG. 8 is a diagram for explaining an example of a configuration of an appliance control table according to an embodiment of the invention.

The configuration of the apparatus control table 213 according to this embodiment is shown in FIG. 8. The apparatus control table 213 holds an apparatus ID 321, an apparatus name 322, an operation ID 323, an operation name 324, a network 325, an apparatus address 326 and a command 327.

The apparatus ID 321 is an ID number indicating the apparatus (home electric appliance) to be operated, and has a unique value for a home, i.e. for the apparatus managed by the remote operation adaptor 106. The apparatus name 322 is the name of the apparatus (home electric appliance). According to this embodiment, for example, the apparatus ID 321 of the air conditioner is defined as "09". The apparatus ID 321 is a value used when the service provider 104 gives an operating instruction to the remote operation adaptor 106 through the public network 105. The operation ID 323 is the ID number indicating the contents of the operation, and the operation name 324 indicates the contents of the operation. Like the apparatus ID 321, the operation ID 323 is also a value used in the case where the service provider 104 gives an operating instruction to the remote operation adaptor 106. In other words, the service provider 104 instructs the remote operation adaptor 106 to operate the home electric appliance using the apparatus ID 321 and the operation ID 323.

According to this embodiment, in the case where an instruction is given to set the operation mode of the air conditioner to "cool", for example, the service provider 104 transmits the values including 09 as the appliance ID 321 and 01 as the operation ID 323 to the remote operation adaptor 106 through the public network 105.

The network 325 has the ID number indicating the home network connected to the apparatus (home electric appliance). In the configuration of the present embodiment shown in FIG. 7, only one home network 108 is employed. Nevertheless, a plurality of home networks may be used in a home. The network (network ID) 325 is for indicating which network the apparatus is connected in the case where a plurality of networks are connected to the remote operation adaptor 106. In the apparatus control table 213 according to this embodiment shown in FIG. 8, the network connected with the remote operation adaptor 106 according to this embodiment is only the home network 108 shown in FIG. 7, and "01" is set as a value indicating the network. The apparatus address 326 is for indicating the address of the apparatus (home electric appliance) on the network.

The command 327 is for giving an operating instruction to the apparatus (home electric appliance) to be operated. The control unit 212 transmits the command 327 to the apparatus (home electric appliance) indicated by the apparatus address 326 on the network represented by the network 325 through the home network interface 214 thereby to control the apparatus (home electric appliance).

Incidentally, the network 325, the apparatus address 326 and the command 327 shown in FIG. 8 are only an example, and generally, their values are determined in accordance with the specification determined for the home network 108.

Figure 9:
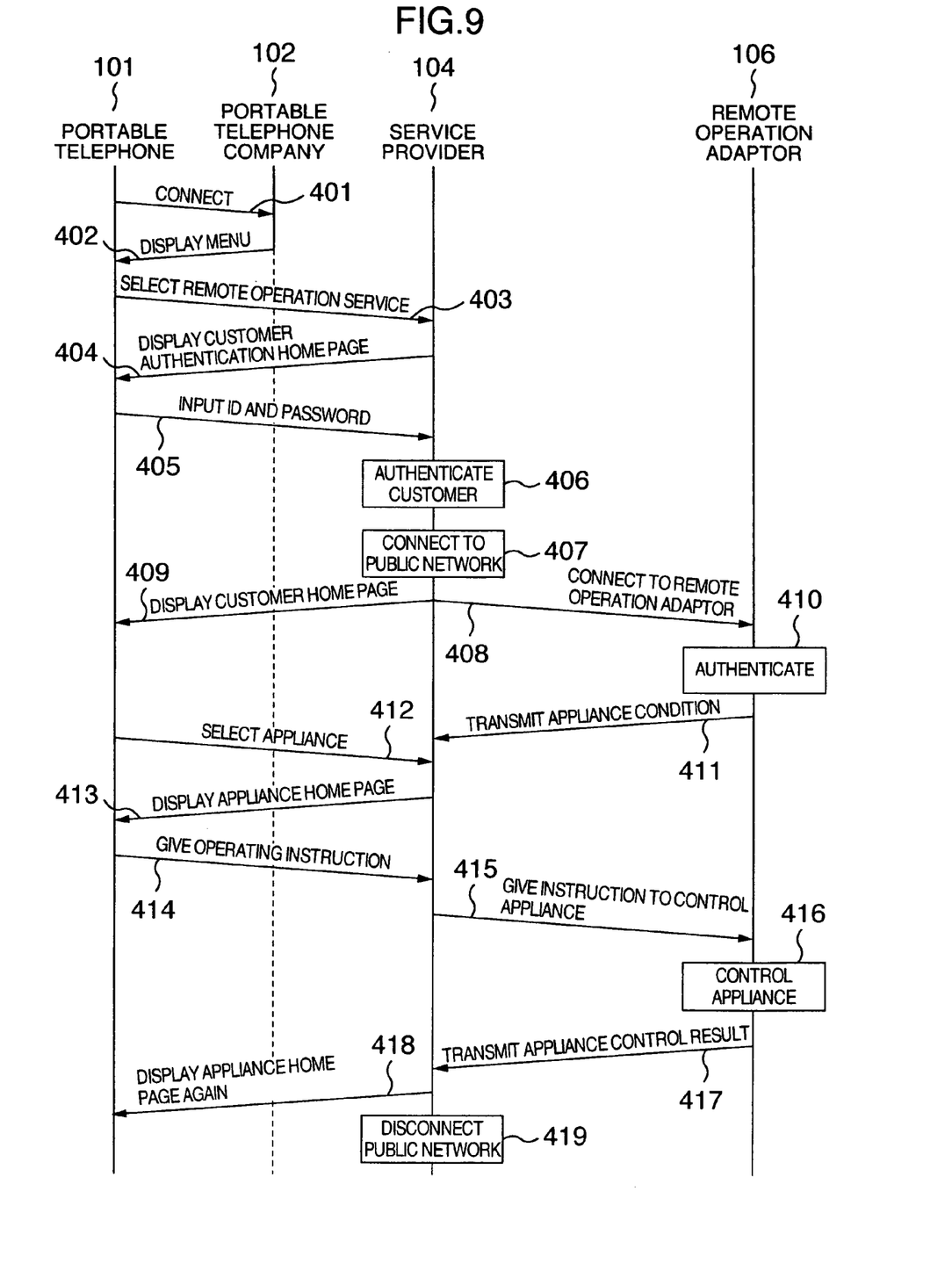
FIG. 9 is a diagram for explaining an example of a process flow in a remote operating system according to an embodiment of the invention.

With reference to FIG. 9, the flow of the process for the remote operating service according to this embodiment will be explained. First, the portable telephone 101 connects the internet connection service of the portable telephone company 102 (step 401). The portable telephone company 102 thus displays a menu of internet connection services on the display unit of the portable telephone 101 (step 402). The user selects the remote operating service from the menu on display. As a result, the portable telephone 101 is connected to the service provider 104 (step 403). As described above, the portable telephone 101 is connected to the service provider 104 through the portable telephone company 102 and the internet 103. The connection between the portable telephone 101 and the service provider 104 was already described in detail with reference to FIG. 2.

As soon as the connection is established with the portable telephone 101, the service provider 104 transmits the customer authentication home page 202 described in FIG. 4 to the portable telephone 101 (step 404). As a result, the customer authentication home page 202 is displayed on the display unit of the portable telephone 101. The user inputs the user ID and the user password and depresses the log-on button 304. The ID and the password thus input are transmitted to the service provider 104 (step 405). In the process, the portable telephone company 102 transmits the telephone number of the portable telephone 101 to the service provider 104. The service provider 104 authenticates the customer by the ID, the password and the telephone number received (step 406). As explained with reference to FIG. 3, the customer is authenticated by referring to the customer data base 204 based on the ID and the password input and the telephone number of the portable telephone 101 sent from the portable telephone company 102.

Upon successful authentication of the user having the portable telephone 101 as a regular customer in the customer authentication step 406, the service provider 104 connects to the public network (step 407). As explained with reference to FIGS. 3 and 5, the service provider 104 rings up the remote operation adaptor telephone number 309 held in the customer data base 204 to connect to the remote operation adaptor 106 of the user (customer) through the public network 105 (step 408). In parallel, the service provider 104 transmits the customer home page 203 to the portable telephone 101 (step 409). This transmission is also carried out, as explained with reference to FIGS. 3 and 5, by transmitting the customer home page 203 to the URL indicated by the home page 308 held in the customer data base 204.

The remote operation adaptor 106 that has received a telephone call from the service provider 104 in step 408 carries out the authentication (step 410). This is for protecting the remote operation adaptor 106 from illegal use and for confirming that the calling party at the other end of the telephone line, i.e. the other party intending to connect to the remote operation adaptor 106 is the service provider 104 in which the user has registered (for participation). A specific authentication method available for use, though not described here, includes a method using the telephone number of the service provider 104 or a method using an ordinary password.

The remote operation adaptor 106, when it can confirm that the calling party at the other end of the telephone line is the service provider 104 in the authentication step 410, transmits the condition of the network-applicable home electric appliance connected to the remote operation adaptor 106, such as the operation mode of the air conditioner (whether it is in cooling operation, heating operation or stationary), and the current room temperature setting, to the service provider 104 (step 411).

On the other hand, the user (customer) selects the apparatus (home electric appliance) which he is desirous of operating on the portable telephone 101 in the customer home page 203 sent to him in step 409 (step 412). As explained with reference to FIG. 6, a list of apparatuses (home electric appliances) operable is displayed in the customer home page 203. The user selects the apparatus (home electric appliances) which he is desirous of operation from the list on display. The service provider 104 transmits to the portable telephone 101 the appliance home page 301 corresponding to the selected apparatus (home electric appliance) sent from the portable telephone 101 (step 413). In the process, the appliance home page 301 is prepared, as required, using the condition of the apparatus (home electric appliance) sent from the remote operation adaptor 106. According to this embodiment, the appliance home page 301 of the air conditioner was explained in FIG. 6. Nevertheless, the room temperature setting 317 and the current operating condition (whether the air-conditioner is cooling, heating, ventilating or stationary (disconnected)) are displayed in the home page in accordance with the condition of any apparatus (home electric appliance) sent from the remote operation adaptor 106.

The user (customer) gives an instruction to operate the apparatus (home electric appliance) in accordance by way of the appliance home page 301 displayed on the portable telephone 101 (step 414). In the case of the air-conditioner, for example, as explained also with reference to FIG. 6, the operation mode and the room temperature setting are determined and sent to the service provider 104 from the portable telephone 101 by depressing the determination button 320. As explained with reference to FIG. 3, the service provider 104, upon receipt of the instruction to operate the apparatus (home electric appliance) from the portable telephone 101, instructs the remote operation adaptor 106 to control the apparatus (home electric appliance) through the public network 105 in accordance with the customer program 205 linked with the customer home page 203 (step 415). The remote operation adaptor 106, upon receipt of an instruction to control the apparatus (home electric appliance) from the service provider 104, as explained with reference to FIG. 7, controls the network-applicable home electric appliance 107 connected to the home network 108 (step 416).

The remote operation adaptor 106, upon completion of the apparatus control operation in step 416, transmits the result, i.e. whether the operation ended normal or abnormal, to the service provider 104 (step 417). The service provider 104, upon receipt of the result of the apparatus control operation from the remote operation adaptor 106, disconnects the public network 105 (step 419). The service provider 104, on the other hand, transmits the appliance home page reflecting the result of the apparatus control operation to the portable telephone 101 (step 418).

In the remote operating system according to this embodiment described above, the home page provided by the service provider from the portable telephone is accessed using the internet connection service provided by the portable telephone company. While watching the operating screen of the remote operation adaptor installed in each home, an instruction can be given to operate the home electric appliance connected to the remote operation adaptor. In this way, the home electric appliances in a home can be easily operated from a place outside the home.

The service provider charges a price on the user (customer) enjoying the remote operating service. This charge may correspond to the actual amount used for each predetermined period, a fixed amount for each predetermined period, or the actual amount used for each predetermined period plus the basic amount.

It will thus be understood from the foregoing description that according to this invention, there is provided a remote operating system using the internet connection service provided by a portable telephone company, in which the electric appliances in a home can be operated easily and in simplistic fashion from a portable telephone located outside the home by watching the home pages displayed on the screen of the portable telephone or by referring to a user-friendly interactive user interface including home pages. Thus, the convenience of the remote operation of the home electric appliances from a place outside a home using the portable telephony now extending widely can be remarkably improved.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A service equipment for use in a remote operating system which includes a portable telephone which is capable of connecting to an internet through a communication line and browsing home pages and a remote operation adapter connected to the communication line and capable of controlling home electric appliances, said service equipment comprising:
   a service equipment unit, connected to the communication line, for providing home pages from the internet,
   wherein said service equipment unit provides said portable telephone with home pages on a screen for giving an instruction to operate a home electric appliance, and transmits to said remote operation adaptor the contents of the operation of the home electric appliance for which an operating instruction is given by said portable telephone on a home page, and
   wherein said remote operation adaptor receives the contents of the operation of the home electric appliance transmitted from said service equipment unit through said communication line and thus controls the home electric appliance connected to said remote operation adaptor.

2. A remote operation adaptor for use in a remote operating system which includes a portable telephone which is capable of connecting to an internet through a communication line and browsing home pages and a service equipment, connected to the communication line, capable of providing home pages from the internet, said remote operation adaptor comprising:
   a remote operation adaptor unit connected to the communication line and having the function of controlling home electric appliances,
   wherein said service equipment provides said portable telephone with home pages on a screen for giving an instruction to operate a home electric appliance, and transmits to said remote operation adaptor contents of an operation of the home electric appliance for which an operating instruction is given by said portable telephone on a home page, and
   wherein said remote operation adaptor unit receives the contents of the operation of the home electric appliance transmitted from said service equipment through said communication line and thus controls the home electric appliance connected to said remote operation adaptor unit.

3. A service equipment according to claim 1, wherein said remote operation adaptor is connected to a home network, and through said home network, controls a home electric appliance connected to said home network.

4. A service equipment according to claim 1, wherein said service equipment unit provides each user with a home page exclusive to said user.

5. A service equipment according to claim 1, wherein said service equipment unit charges a selected one of a price corresponding to the actual amount of use for each predetermined period, a fixed price for each predetermined period and a price corresponding to the actual amount of use plus a basic price for each predetermined period.

6. A remote operation adaptor according to claim 2, wherein said remote operation adaptor unit is connected to a home network, and through said home network, controls a home electric appliance connected to said home network.

7. A remote operation adaptor according to claim 2, wherein said service equipment provides each user with a home page exclusive to said user.

8. A remote operation adaptor according to claim 2, wherein said service equipment charges a selected one of a price corresponding to the actual amount of use for each predetermined period, a fixed price for each predetermined period and a price corresponding to the actual amount of use plus a basic price for each predetermined period.

9. A remote operating system comprising:
a portable telephone having the function of connecting to an internet through a communication line and the function of browsing home pages;
a service equipment connected to the communication line for providing home pages from the internet; and
a remote operation adaptor connected to the communication line and having the function of controlling home electric appliances,
wherein said service equipment provides each user with an exclusive home page as a screen for giving an instruction to operate a home electric appliance in response to a request for accessing the remote operating service from said portable telephone, and transmits an instruction to said remote operation adaptor in accordance with contents of an operation of the user on said home page using a customer program linked with said home page, and
wherein a selected one of said service equipment and a host system of a service provider acquires, from an electric home appliance maker through an internet, control specification data of the home electric appliance constituting basic data for preparing a selected one of said home page and said customer program.

10. A service equipment for use in a remote operating system which includes a portable telephone which is capable of connecting to an internet through a communication line and browsing home pages and a remote operation adaptor connected to the communication line and capable of controlling home electric appliances, said service equipment comprising:
a service equipment unit, connected to the communication line, for providing home pages from the internet,
wherein said service equipment unit provides each user with an exclusive home page as a screen for giving an instruction to operate a home electric appliance in response to a request for accessing the remote operating service from said portable telephone, and transmits an instruction to said remote operation adaptor in accordance with the contents of the operation of the user on said home page using a customer program linked with said home page, and
wherein a selected one of said service equipment unit and a host system of a service provider acquires, from an electric home appliance maker through an internet, control specification data of the home electric appliance constituting basic data for preparing a selected one of said home page and said customer program.

11. A remote operation adaptor for use in a remote operating system which includes a portable telephone which is capable of connecting to an internet through a communication line and browsing home pages and a service equipment, connected to the communication line, capable of providing home pages from the internet, said remote operation adaptor comprising:
a remote operation adaptor unit connected to the communication line and having the function of controlling home electric appliances,
wherein said service equipment provides each user with an exclusive home page as a screen for giving an instruction to operate a home electric appliance in response to a request for accessing the remote operating service from said portable telephone, and transmits an instruction to said remote operation adaptor unit in accordance with contents of an operation of the user on said home page using a customer program linked with said home page, and
wherein a selected one of said service equipment and a host system of a service provider acquires, from an electric home appliance maker through an internet, control specification data of the home electric appliance constituting basic data for preparing selected one of said home page and said customer program.

12. A program for a service equipment usable in a remote operating system which includes a portable telephone which is capable of connecting to an internet through a communication line and browsing home pages and a remote operation adaptor connected to the communication line and capable of controlling home electric appliances, said service equipment being connectable to said communication line, said program when executed causes said service equipment to perform the steps of:
providing said portable telephone with home pages on a screen for giving an instruction to operate a home electric appliance; and
transmitting to said remote operation adaptor contents of an operation of the home electric appliance for which an operating instruction is given by said portable telephone on a home page,
wherein said remote operation adaptor receives the contents of the operation of the home electric appliance transmitted from said service equipment unit through said communication line and thus controls the home electric appliance connected to said remote operation adaptor.

\* \* \* \* \*